(12) United States Patent
Darias et al.

(10) Patent No.: US 9,860,351 B1
(45) Date of Patent: Jan. 2, 2018

(54) TOOL-FREE INTERCHANGEABLE PHONE COVER

(71) Applicant: Desk Phone Designs, Inc., Brandon, FL (US)

(72) Inventors: Ernie Darias, Brandon, FL (US); Jamie Wood, Brandon, FL (US)

( * ) Notice: Subject to any disclaimer, the term of this patent is extended or adjusted under 35 U.S.C. 154(b) by 0 days.

(21) Appl. No.: 15/245,248

(22) Filed: Aug. 24, 2016

(51) Int. Cl.
*H04M 1/00* (2006.01)
*H04M 1/02* (2006.01)

(52) U.S. Cl.
CPC .................................. *H04M 1/02* (2013.01)

(58) Field of Classification Search
CPC ....................................................... H04M 1/02
See application file for complete search history.

(56) References Cited

U.S. PATENT DOCUMENTS

| | | | |
|---|---|---|---|
| 2,244,918 A | 6/1941 | Obergfell | |
| 2,473,775 A | 6/1949 | Allen | |
| 2,572,814 A | 10/1951 | Laporte | |
| 3,133,163 A | 5/1964 | Persson | |
| 3,491,221 A | 1/1970 | Zamarra | |
| 3,553,388 A | 1/1971 | Mirrer | |
| 3,617,658 A | 11/1971 | Gruger | |
| 3,657,487 A | 4/1972 | Schwanck | |
| 3,838,229 A | 9/1974 | Morrell | |
| 4,179,591 A | 12/1979 | Becker | |
| 4,292,481 A | 9/1981 | Barnes | |
| D263,225 S | 3/1982 | Jordan | |
| D268,674 S | 4/1983 | Jordan | |
| 4,396,810 A | 8/1983 | Cover | |
| 4,546,217 A | 10/1985 | Frehn | |
| 4,937,860 A | 6/1990 | Smith | |
| 5,373,556 A | 12/1994 | Johnson | |
| 5,889,859 A | 3/1999 | Lundell | |
| 6,347,218 B1 * | 2/2002 | Fuhrmann | H04M 1/0283 379/433.11 |
| 2008/0056486 A1 | 3/2008 | Yoshida | |

* cited by examiner

*Primary Examiner* — Tuan D Nguyen
(74) *Attorney, Agent, or Firm* — Larson & Larson, P.A.; Justin P. Miller; Patrick A. Reid

(57) ABSTRACT

The disclosed device is a cover for a telephone that requires no tools to install. The cover includes multiple penetrations to provide access to buttons, displays, or speakers beneath the cover. A sidewall connects to all or substantially all of the perimeter of the cover. One or more locking teeth on the sidewall latch into a gap in the phone, locking the cover to the phone without the use of tools. Correspondingly, the cover is readily removable without the use of tools.

13 Claims, 8 Drawing Sheets

TOOL-FREE INTERCHANGEABLE PHONE COVER

FIELD

This invention relates to the field of phone parts and more particularly to a device that securely affixes (snaps on) to the front of an office phone without the need for tools.

BACKGROUND

Telephones are an essential element of communication, required by every employee of a company. But for years the appearance of the office telephone has not changed. The gray or black boxes all look the same from office to office and company to company.

The use of phones extends beyond the office, with multi-line phones found in hotels, airports, and home offices. Despite the great variety of places phones are found, their appearance has remained static.

For a number of years, customers have made requests for different desk phones colors other than what was normally available in the industry like black or grey or some combination of these colors. Customers require the phones appearance to be more reflective of their business brand and personality. This is nearly impossible with standard manufactured phones.

Furthermore, cleaning standard manufactured phones is difficult. In the setting of a restaurant kitchen or auto garage it is common for the phone to become dirty. But the sensitive electronics within the housing of the phone do not respond well to water or solvents. Thus, cleaning the face of the phone can only be performed with great care. What is needed is a cover for a phone that is easily removable, cleanable, and replaceable by a user.

The snap on phone cover is convenient to remove and clean with soap and water and snap back on. They protect the original features of the manufactured business phone and preserves its factory warranty as well as providing a protective cover limiting the exposure of dust and dirt to the phones natural appearance.

What is needed is a cover for a phone that is readily installable by a user, and readily replaceable for cleaning.

SUMMARY

The disclosed device is a cover for a telephone that requires no tools to install. The cover includes multiple penetrations to provide access to buttons, displays, or speakers beneath the cover. A sidewall connects to all or substantially all of the face of the cover. One or more locking teeth on the sidewall latch into a gap in the phone, locking the cover to the phone without the use of tools. Correspondingly, the cover is readily removable without the use of tools.

Currently, to change the appearance of an office phone there are two options. The first is to paint the front of the phone. For painting, each button is first covered with tape to avoid introducing paint into the interior of the phone. As a result of requiring so much labor, the cost of repainting the phone is high, and the result depends upon the skill of the painter.

The second option is to remove the front cover of the phone, either replacing it with a new cover, or painting it and re-installing. The key problem with removing the front cover is that such a modification voids the warranty of the phone. Additionally, such a replacement cannot be performed by most users, and it is nearly as labor-intensive as painting the phone.

Given that removal of the face of the phone is so discouraged, the disclosed device is an overlay that affixes to the front of the phone. No painting is required, and the phone requires no disassembly, thus the warranty is unaffected. Installation and removal are simple, and thus able to be performed by any user.

The disclosed tool-free phone cover includes a front panel with an exterior surface and an interior surface. The perimeter of the front panel adjoins a sidewall, the sidewall connects to all or substantially all of the front panel. When in use the sidewall encloses a portion of the sides of a phone by overlapping the edges of the phone.

The sidewall includes one or more locking teeth. The locking teeth interact with a depression found on nearly all office phones.

The housing of nearly every office phone is formed from two primary parts—an upper half and a lower half. Between the upper half and lower half is a trough or channel. It is this trough, channel, or notch into which the locking teeth of the tool-free cover lock.

The locking teeth may be a single continuous tooth that is the length of the sidewall, or one or more a discontinuous teeth or prongs that interface with the trough or notch at specific locations.

The prong may be of a square profile, or a tapered profile, narrower further from the face of the cover. A tapered profile encourages the prong to lock into the notch, securing the tool-free cover in place. The tapered profile may take the form of a trapezoid or a triangle.

The phone cover may be of many colors and patterns. There are multiple ways to color the tool-free phone cover.

The first is by molding the tool-free phone cover using material of the desired color or finish. Examples include colored plastic or metal.

The second is to cut the cover from the desired material. For example, using a CNC machine to cut from a block of aluminum.

The third option is water transfer printing. Water transfer printing uses a layer of ink floated on a surface water, then transferred to the article. The summarized steps are as follows:

1. A film is chosen based upon the desired design to be applied to the article.
2. The chosen film is floated in a water bath.
3. An activator is applied to the floating film. The activator dissolves the film, leaving the ink on the surface of the water.
4. The article is then immersed into the water. As the article is immersed the floating layer of ink adheres to the surface of the article, coating its surface. The article is then washed and protected with a clear topcoat.

With this understanding of the disclosed device, discussed next are specific embodiments.

BRIEF DESCRIPTION OF THE DRAWINGS

The invention can be best understood by those having ordinary skill in the art by reference to the following detailed description when considered in conjunction with the accompanying drawings in which.

DETAILED DESCRIPTION

Figure 1:
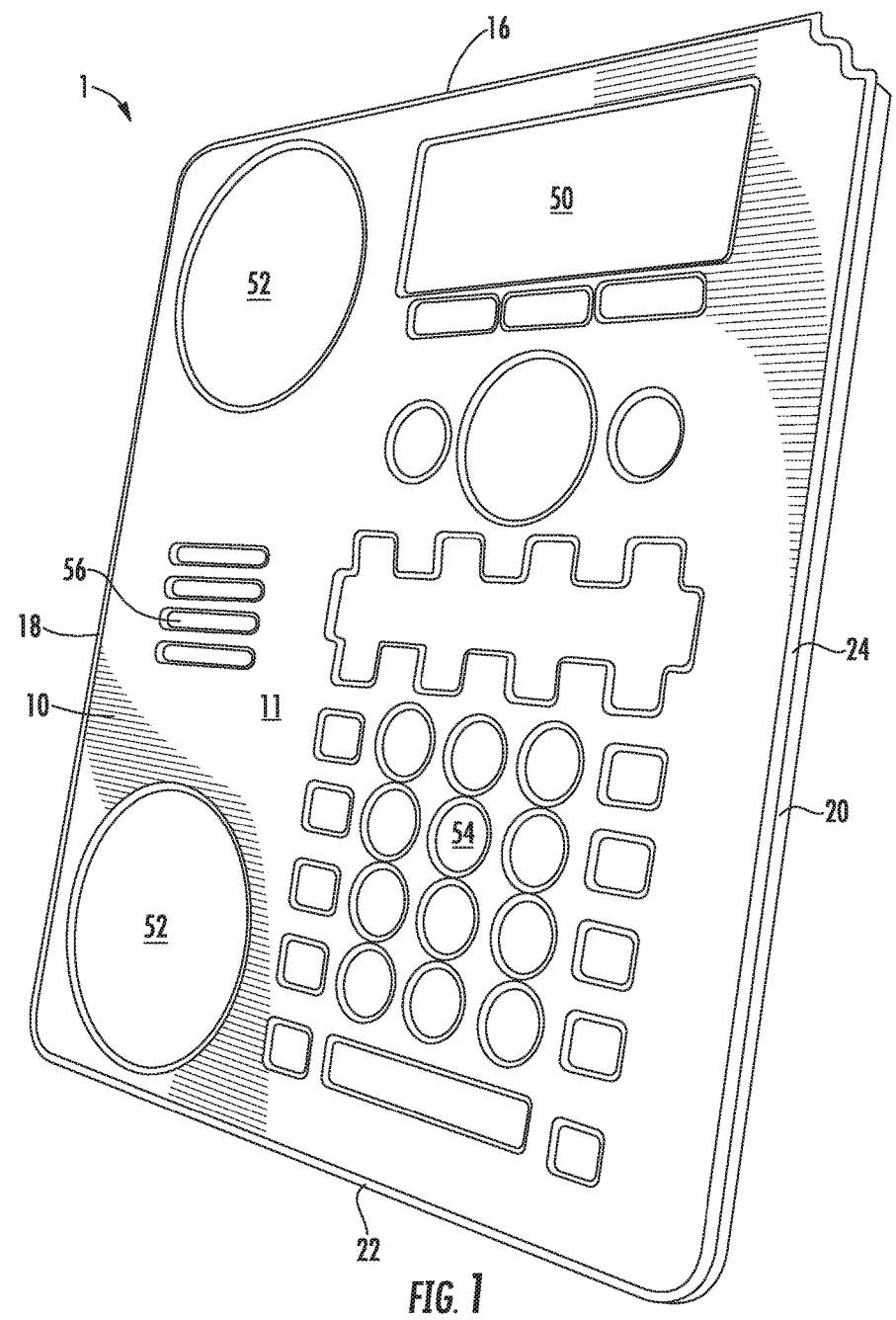
FIG. 1 is an isometric view of a first embodiment.

Reference will now be made in detail to the presently preferred embodiments of the invention, examples of which are illustrated in the accompanying drawings. Throughout the following detailed description, the same reference numerals refer to the same elements in all figures.

Referring to FIG. 1, an isometric view of a first embodiment is shown. The tool-free phone cover 1 includes a front panel 10 with an exterior surface 11 and interior surface 12 (hidden from view). Bordering the front panel 10 is a sidewall 14 that is made up of an upper side 16, a left side 18, a right side 20, and a lower side 22. An optional rounded edge 24 connects the front panel 10 to the sidewall 14.

To allow for operation of the underlying phone 70 (not shown), the tool-free phone cover 1 includes numerous cutouts for access to the buttons. Included are the display cutout 50, handset cutout 52, button cutout 54, speaker cutout 56, and indicator light cutout 58.

Figure 2:
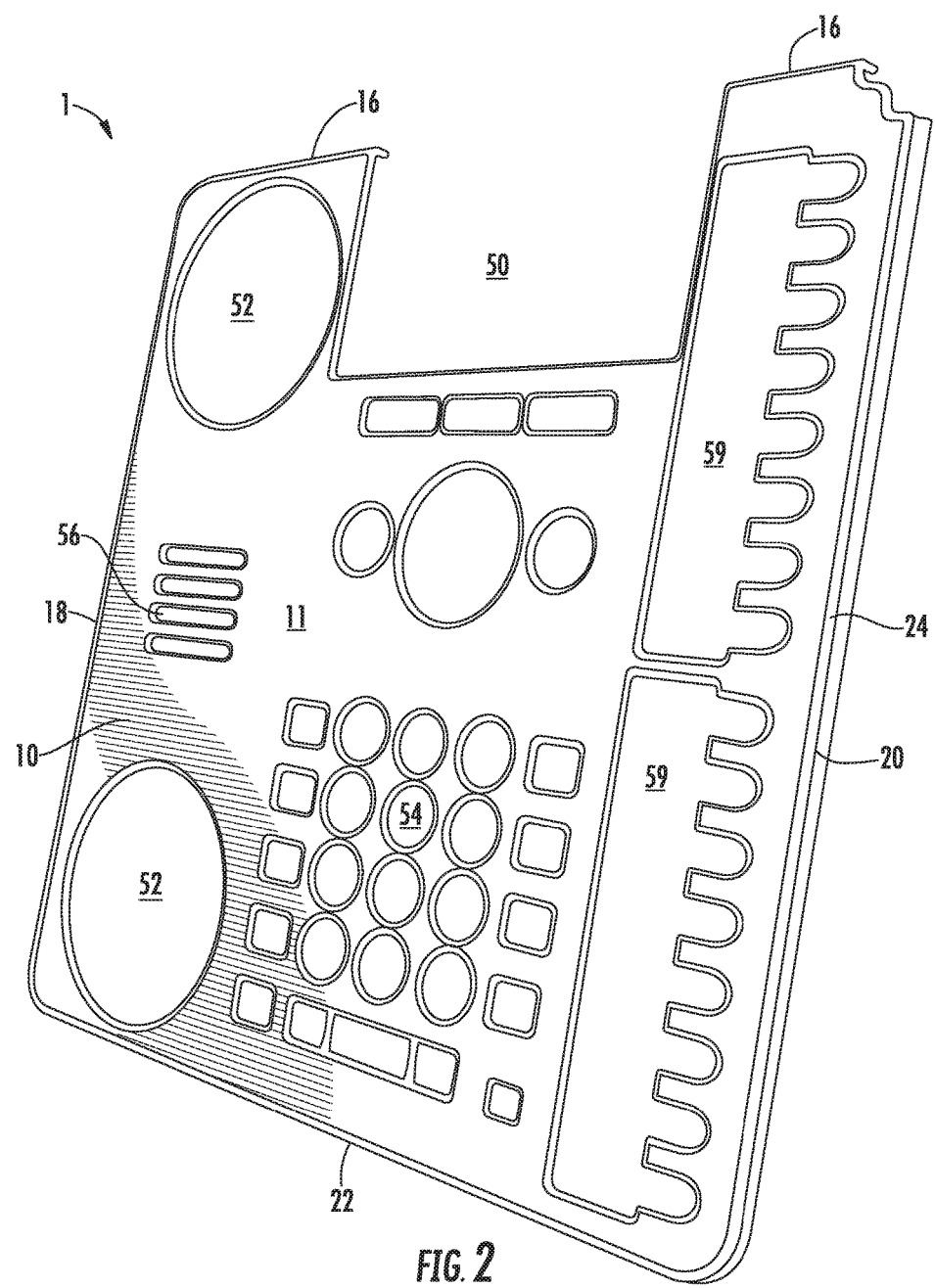
FIG. 2 is an isometric view of a second embodiment.

Referring to FIG. 2, an isometric view of a second embodiment is shown. The second embodiment of the tool-free phone cover 1 includes similar cutouts as the first embodiment, with the addition of an extensions cutout 59. Furthermore, the display cutout 50 is placed higher on the front panel 10 of the tool-free phone cover 1, resulting in a break in the upper side 16.

Figure 3:
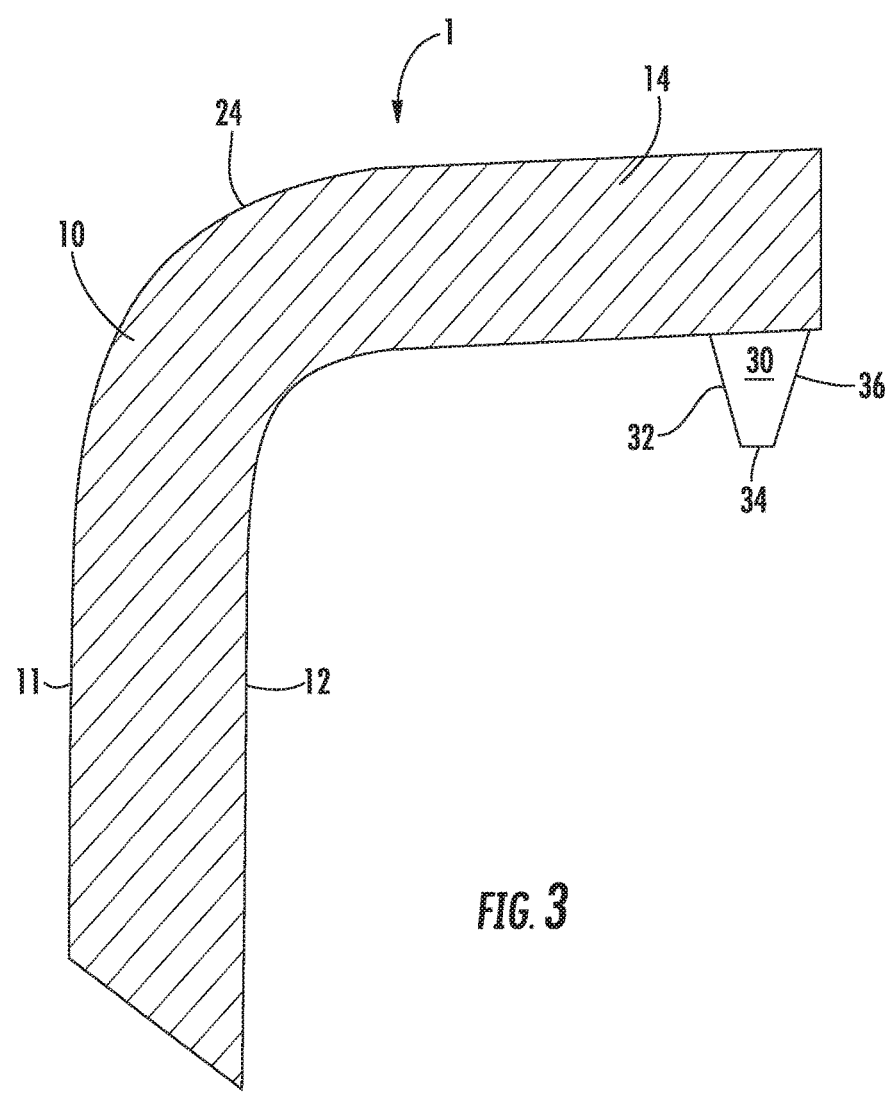
FIG. 3 is a cross-sectional view of a sidewall and locking tooth of the disclosed device.

Referring to FIG. 3, a cross-sectional view of a sidewall and locking tooth of the disclosed device is shown. The illustrated portion of the tool-free phone cover includes the front panel 10 with exterior surface 11 and interior surface 12, turning into sidewall 14, with the optional rounded edge 24.

In this embodiment the locking tooth 30 has a tapered profile. The locking tooth interior surface 32, locking tooth bottom surface 34, and locking tooth exterior surface 36 form a locking tooth 30 that has a narrower bottom than top, which acts to draw the locking tooth 30 into the phone. This is shown in subsequent figures.

Figure 4:
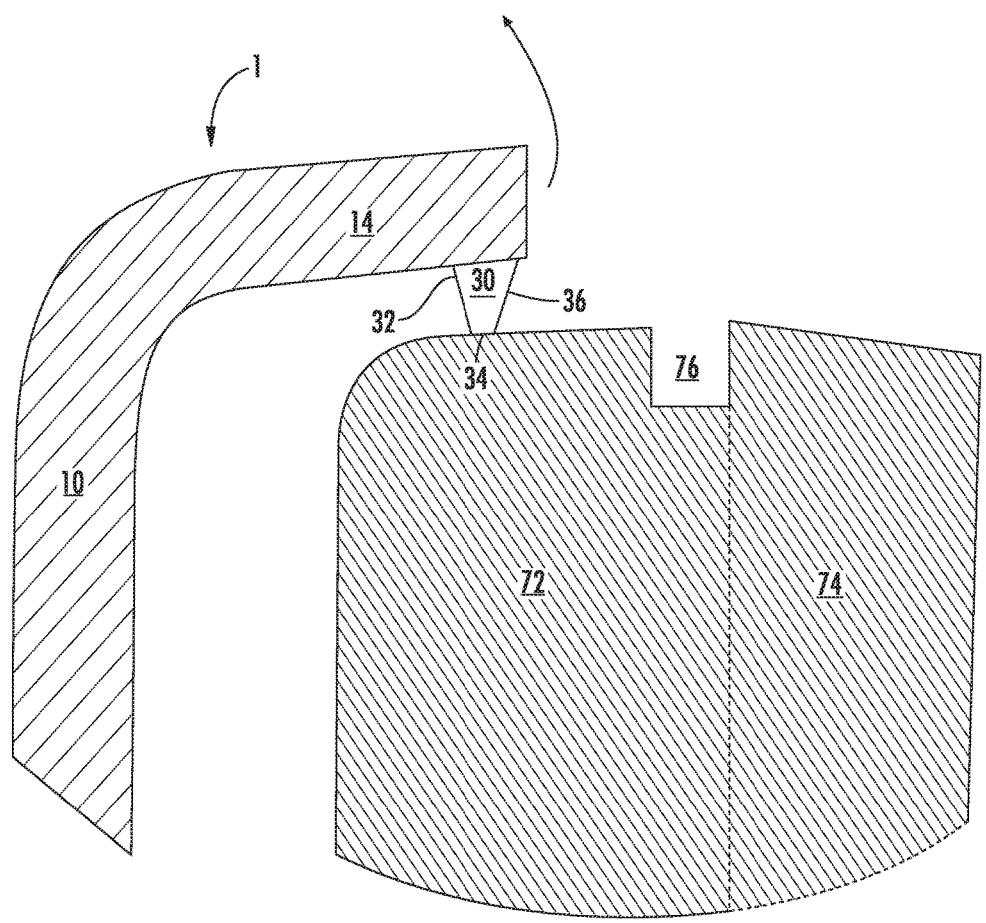
FIG. 4 is a cross-sectional view of a sidewall and locking tooth of the disclosed device as the device is attached to a phone.

Referring to FIG. 4, a cross-sectional view of a sidewall and locking tooth of the disclosed device as the device is attached to a phone is shown.

As the locking tooth bottom surface 34 passes over the housing upper half 72 of the phone 70, the sidewall 14 and face 10 deform, stretching outward. The tool-free phone cover 1 is constructed of a resilient material and it desires to return to its original shape.

Figure 5:
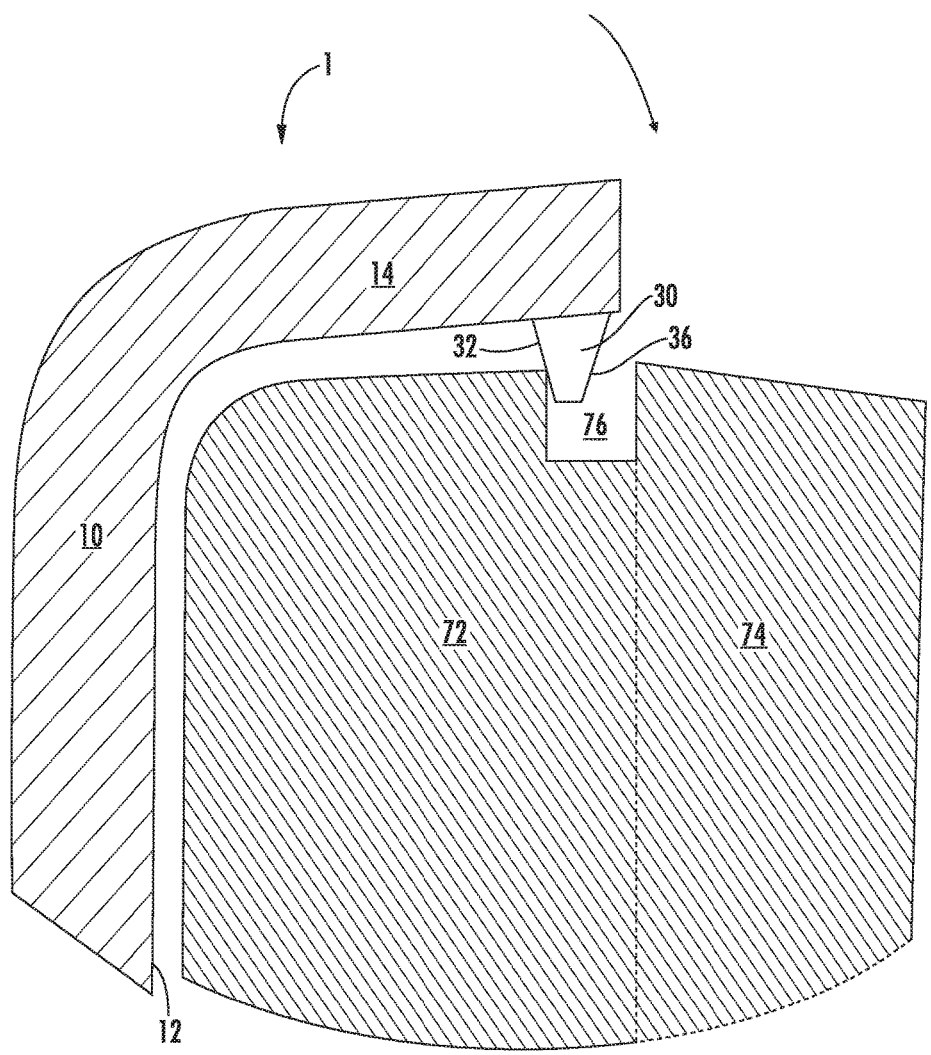
FIG. 5 is a cross-sectional view of a sidewall and locking tooth of the disclosed device as the device grips the trough with its tooth.

Referring to FIG. 5, a cross-sectional view of a sidewall and locking tooth of the disclosed device as the device grips the trough with its tooth is shown.

With the tool-free phone cover 1 substantially covering the phone 70, the locking tooth 30 starts to engage the trough 76. The locking tooth interior surface 32 slides along the edge of the trough 76, the taper profile pulling the interior surface 12 toward the housing upper half 72. Adjacent to the trough 76 is the housing lower half 74.

The deformation of the front panel 10 and sidewall 14 lessens as the locking tooth 30 begins to settle into the trough 30.

Figure 6:
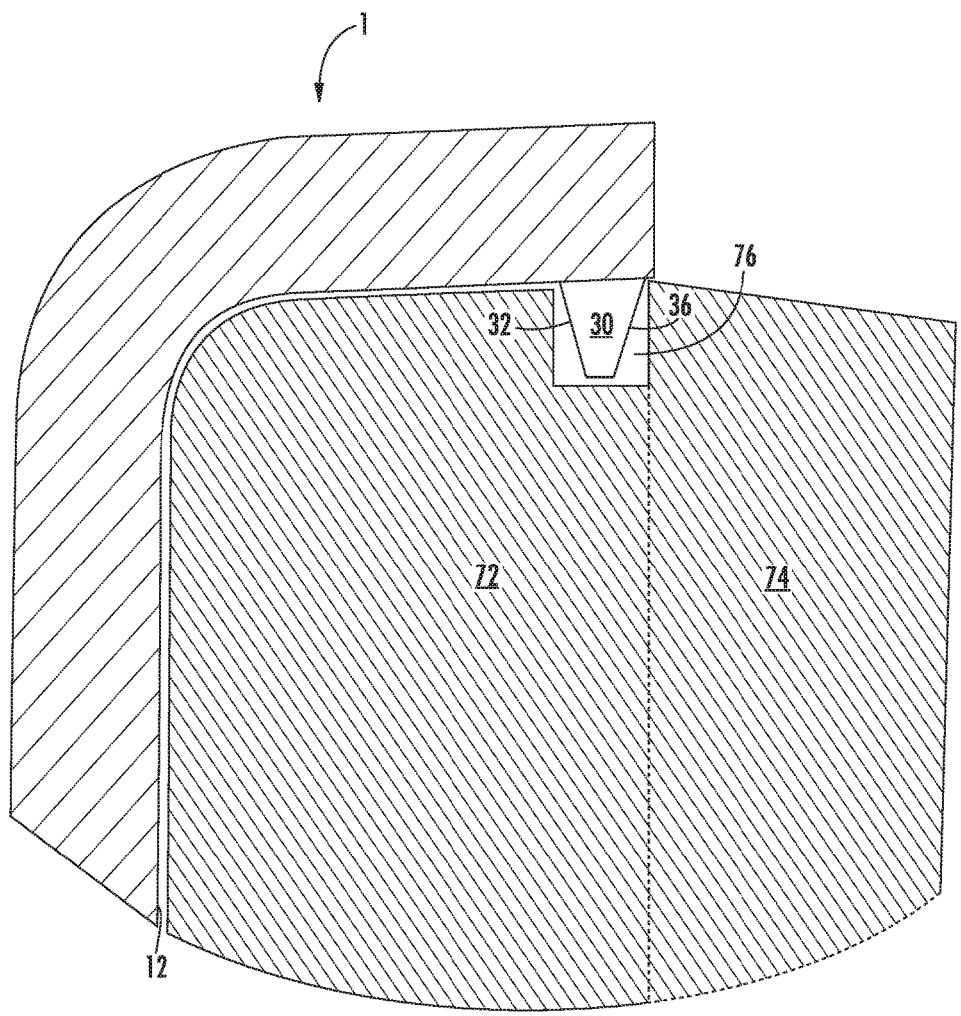
FIG. 6 is a cross-sectional view of a sidewall and locking tooth after attachment to a phone.

Referring to FIG. 6, a cross-sectional view of a sidewall and locking tooth after attachment to a phone is shown.

The tool-free phone cover 1 is shown locked into the trough 76 of the phone 70. The interior surface 12 is now adjacent to the housing upper half 72.

Figure 7:
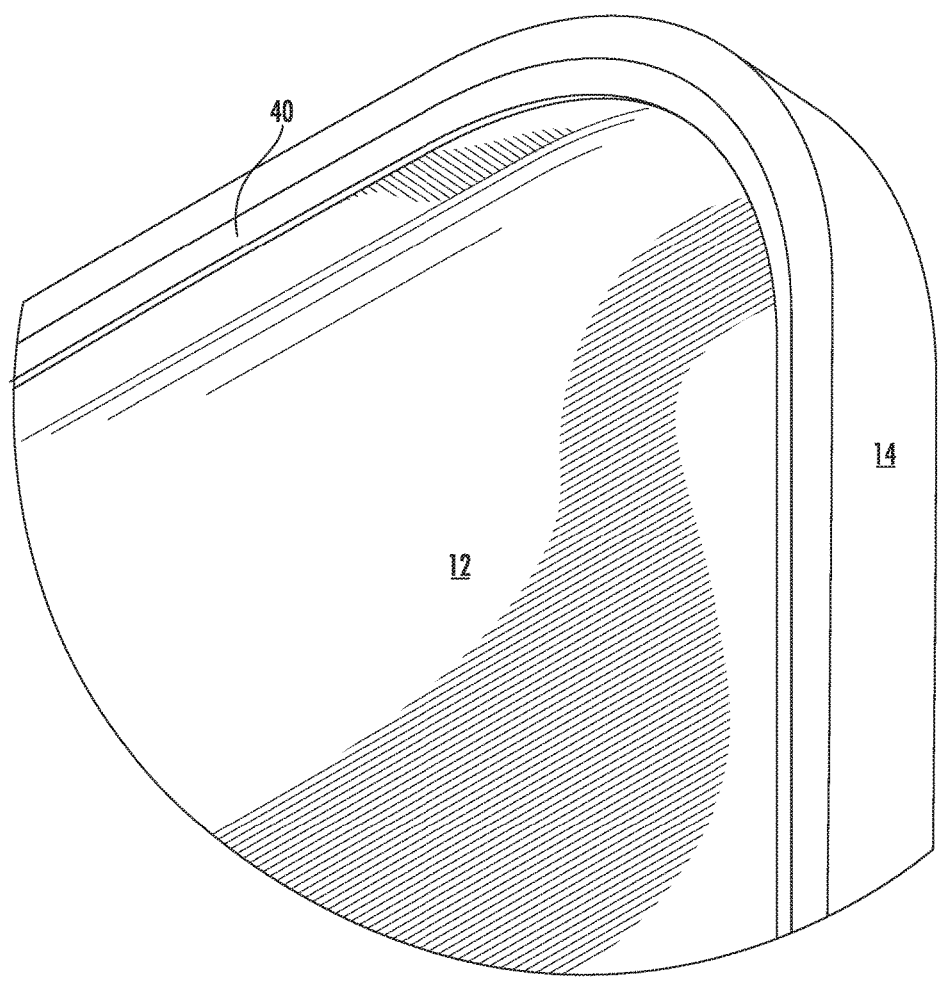
FIG. 7 is a cross-sectional view of a sidewall having a continuous tooth.

Referring to FIG. 7, a cross-sectional view of a sidewall and continuous tooth is shown.

The locking teeth of the tool-free phone cover 1 may be continuous, thus continuing around the entire front panel 10, locking into the phone 70. A portion of such a continuous locking tooth 40 is shown in FIG. 7. Such a continuous tooth has both benefits and detriments. The continuity provides a strong and resilient connection between the tool-free phone cover 1 and the phone 70. The disadvantage of such a strong connection is that removal of the tool-free phone cover 1 is more difficult. Thus, it is desirable to have an option for a more easily removed cover.

Figure 8:
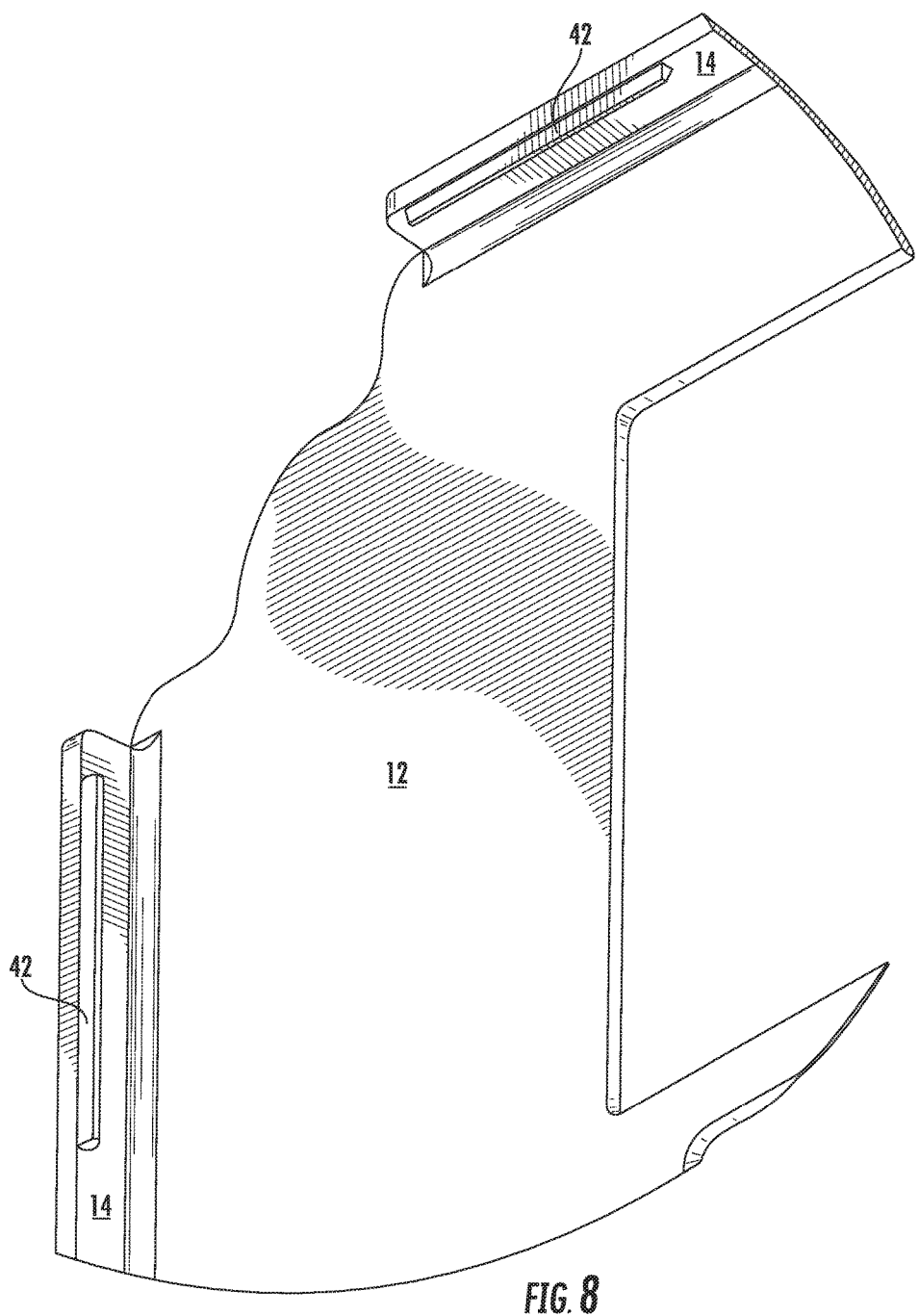
FIG. 8 is a cross-sectional view of a sidewall and discontinuous teeth.

Referring to FIG. 8, a cross-sectional view of a sidewall with discontinuous teeth is shown.

The discontinuous locking teeth 42 are more easily disengaged from the phone 70. This is because the portions of the sidewall 14 without teeth can be pried away from the phone 70 by the user's fingers.

Equivalent elements can be substituted for the ones set forth above such that they perform in substantially the same manner in substantially the same way for achieving substantially the same result.

It is believed that the system and method as described and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely exemplary and explanatory embodiment thereof. It is the intention of the following claims to encompass and include such changes.

What is claimed is:

1. A tool-free phone cover that allows one to easily change the appearance of an office phone, the tool-free phone cover comprising:
   a. a front panel;
   b. a sidewall connected to the front panel, the sidewall oriented perpendicular to the front panel;
   c. a plurality of discontinuous locking teeth disposed on an inside surface of the sidewall;
   d. a display cutout to permit a display of the office phone to be visible;
   e. a handset cutout to permit a handset to be placed on the office phone, through the tool-free phone cover;
   f. a speaker cutout to permit sound from a speaker within the office phone to be heard through the tool-free phone cover;
   g. whereby the plurality of discontinuous locking teeth interface with a groove present on the office phone, removably locking the tool-free phone cover to the office phone;
   h. wherein the front panel and sidewall deform during installation of the tool-free phone cover onto the office phone, and the front panel and sidewall deform during removal of the tool-free phone cover, the action of deforming allowing the plurality of discontinuous locking teeth to be inserted into, and removed from, the groove of the office phone.

2. The tool-free phone cover of claim 1, wherein the front panel allows access to buttons on the office phone through a plurality of penetrations.

3. The tool-free phone cover of claim 1, further comprising
   a. a layer of ink on a front face of the front panel;
   b. whereby the layer of ink changes the appearance of the office phone.

4. The tool-free phone cover of claim 1, wherein the sidewall is discontinuous to prevent the front panel from covering a display of the office phone.

5. A removable cover to allow one to easily change a color of an office phone, the office phone having a housing divided into an upper half and a lower half, the office phone having a continuous gap between the upper half and the lower half, the removable cover comprising: a. a deformable planar faceplate having four sides and a perimeter; b. a deformable sidewall adjoining the perimeter on all four sides; i. the deformable sidewall having an inner face and an outer face; c. one or more locking teeth protruding from the inner face of the deformable sidewall; d. whereby the one or more locking teeth interface with the continuous gap between the upper half and lower half of the housing; e. wherein the one or more locking teeth are disengaged from the gap by bending the deformable planar faceplate and deformable sidewall; f. a display cutout to permit a display of the office phone to be visible; g. a handset cutout to permit a handset to be placed on the office phone, through the tool-free phone cover.

6. The removable cover of claim 5, wherein the deformable planar faceplate allows access to buttons on the office phone through a plurality of penetrations.

7. The removable cover of claim 5, further comprising
   a. a layer of ink on a front face of the deformable planar faceplate;
   b. whereby the layer of ink changes the appearance of the office phone.

8. The removable cover of claim 5, wherein the deformable sidewall is discontinuous to prevent the deformable planar faceplate from covering a display of the office phone.

9. A removable cover for an office phone,
   a. the office phone comprising:
      i. an upper half and a lower half,
      ii. the upper half connected to the lower half and forming a notch; and
   b. the removable cover comprising:
      i. a front panel having a perimeter,
      ii. a sidewall connected perpendicularly to the perimeter of the front panel, the sidewall further comprising an inner surface and an outer surface, and
      iii. a plurality of locking teeth extending perpendicularly from the inner surface of the sidewall,
      iv. whereby the plurality of locking teeth affix the removable cover to the office phone by interfacing with the notch;
   c. a display cutout to permit a display of the office phone to be visible;
   d. a handset cutout to permit a handset to be placed on the office phone, through the tool-free phone cover;
   e. a speaker cutout to permit sound from a speaker within the office phone to be heard through the tool-free phone cover;
   f. wherein the removable cover is installed on the office phone by deformation of the front panel and sidewall, which allows the plurality of locking teeth to pass over the upper half, and then latch into the notch that lies between the upper half and the lower half.

10. The removable cover of claim 9, wherein the plurality of locking teeth are tapered with a cross-sectional shape of a trapezoid.

11. The removable cover of claim 9, wherein the removable cover allows access to buttons on the office phone through a plurality of penetrations.

12. The removable cover of claim 9, further comprising
   a. a layer of ink on a front face of the front panel;
   b. whereby the layer of ink changes the appearance of the office phone.

13. The removable cover of claim 9, wherein the sidewall is discontinuous to prevent the front panel from covering a display of the office phone.

* * * * *